United States Patent [19]

Neumann

[11] 3,843,768

[45] Oct. 22, 1974

[54] PROCESS FOR THE PREPARATION OF SODIUM CARBONATE MONOHYDRATE FROM A SODIUM HYDROXIDE SOLUTION PRODUCED ACCORDING TO THE DIAPHRAGM PROCESS

[75] Inventor: Ulrich Neumann, Rodenkirchen, Germany

[73] Assignee: Chemiebau Dr. A. Zieren GmbH & Co., KG, Cologne, Germany

[22] Filed: July 25, 1972

[21] Appl. No.: 274,991

Related U.S. Application Data

[63] Continuation-in-part of Ser. Nos. 226,024, Feb. 14, 1972, which is a continuation-in-part of Ser. No. 268,854, July 3, 1972, abandoned.

[30] Foreign Application Priority Data

June 2, 1971   Germany........................... 2132922

[52] U.S. Cl.................. 423/190, 423/186, 423/421
[51] Int. Cl. ....... C01d 7/00, C01d 7/26, C01d 7/34
[58] Field of Search ........... 423/182, 183, 186, 189, 423/190, 421, 429, 426

[56] References Cited
UNITED STATES PATENTS

| | | | |
|---|---|---|---|
| 2,842,489 | 7/1968 | Suanoe | 423/182 |
| 3,079,227 | 2/1963 | Brunner et al. | 423/190 |
| 3,202,477 | 8/1965 | Loeffler | 423/421 |
| 3,644,089 | 2/1972 | Minz et al. | 423/421 |

FOREIGN PATENTS OR APPLICATIONS

1,171,732   11/1969   Great Britain ...................... 423/426

*Primary Examiner*—Oscar R. Vertiz
*Assistant Examiner*—Gary P. Straub
*Attorney, Agent, or Firm*—Millen, Raptes & White

[57] ABSTRACT

A single stage process for producing sodium carbonate monohydrate by carbonating an aqueous sodium hydroxide solution contaminated with an inorganic salt with a $CO_2$-containing gas to form the monohydrate and simultaneously evaporate water from the solution. Particulate monohydrate is separated from its mother liquor and washed to remove contaminating salt-containing solution adhering thereto. Some mother liquor is recycled to the carbonation stage so as to establish and maintain a relatively high steady state concentration of soluble contaminating salt below the saturation concentration thereof in the liquid carbonation phase, thereby controlling buildup of contaminating salt and allowing continuous production of sodium carbonate monohydrate having commercially acceptable purity.

13 Claims, No Drawings

PROCESS FOR THE PREPARATION OF SODIUM CARBONATE MONOHYDRATE FROM A SODIUM HYDROXIDE SOLUTION PRODUCED ACCORDING TO THE DIAPHRAGM PROCESS

CROSS-REFERENCE TO RELATED APPLICATIONS

This application is a continuation-in-part of U.S. Pat. application Ser. No. 226,024 filed Feb. 14, 1972, and U.S. Pat. application Ser. No. 268,854 filed July 3, 1972 now abandoned, the contents of which are incorporated by reference herein.

BACKGROUND OF THE INVENTION

1. Field of the Invention

This invention relates to a process for the preparation of sodium carbonate monohydrate. More particularly, this invention relates to a process for producing sodium carbonate monohydrate from a sodium hydroxide solution obtained in the production of chlorine via the diaphragm cell process.

2. Description of the Prior Art

In order to meet the greatly increasing demand for chlorine, the electrolysis of sodium chloride according to the diaphragm process is being increasingly utilized. In addition to chlorine, a sodium hydroxide solution having a high NaCl content is obtained as a product in this process. Heretofore, this sodium hydroxide solution from the diaphragm has been evaporated to at most about 50 percent by weight NaOH, during which a large portion of the NaCl precipitates and can be separated from the sodium hydroxide solution. The thus-obtained sodium hydroxide solution still contains about 1 percent by weight of NaCl and can be further purified by extraction procedures. The marketability for sodium hydroxide solutions, however, is far lower than that for chlorine.

Several suggestions have been advanced for converting the sodium hydroxide solution obtained in the diaphragm process into sodium carbonate which can be sold more readily than the sodium hydroxide solution and is widely utilized in the glass industry as dense-grade soda ash. Thus, it is known from German Pat. No. 1,188,059 to carbonate the diaphragm caustic liquor together with ammoniacal brines from an ammonia-soda process. Although NaCl in the caustic liquor is thereby completely coverted into soda, this procedure exhibits the severe practical disadvantage that a close connection must be maintained between the sodium chloride electrolysis plant and the soda plant, which plants are seldom found at the same location. Furthermore, the sodium hydroxide solution fed to the soda plant must there be processed into soda via the expensive two-step process of carbonation to bicarbonate followed by calcination to soda. Additionally, this method of directly treating NaOH from the caustic diaphragm liquor produces a soda of a low density, whereas the high density material is commercially preferred.

It is known from German Pat. No. 1,141,627 to carbonate sodium hydroxide solution in a first stage without either evaporation of water or separation of the monohydrate, and to precipitate sodium carbonate monohydrate from the carbonated solution in a second stage with the vaporization of water. While processing the caustic liquid containing NaCl, the mother liquor which is recycled must be constantly purified to minimize adherence of NaCl to the separated monohydrate. The purification step inherently leads to either considerable losses of sodium carbonate and sodium hydroxide, if a commercially acceptable quality of soda is to be produced, or an excessively high NaCl content in the soda. A further disadvantage of this process resides in the requirement that the water to be vaporized must be withdrawn under reduced pressure.

In U. S. Pat. No. 2,842,489, a three-stage carbonation process is described for the production of sodium carbonate monohydrate from caustic diaphragm liquor wherein the filtrate from the monohydrate precipitation step is carbonated to sesquicarbonate and the thus-formed mother liquor is further carbonated to bicarbonate. solid sesquicarbonate and bicarbonate can be used for the additional carbonation of diaphragm liquor. Due to its technical complexity, this process has not achieved commercial acceptance.

Carbonation by spraying in a $CO_2$-containing gas, for example as taught in U.S. Pat. No. 3,202,477, is unsuitable for treatment of diaphragm liquor to produce commercial quality soda, because the NaCl content of the liquor remains in the soda. Additionally, the spraying method yields only a low bulk density soda of limited marketability which must be further processed to obtain the high density form, since only the monohydrate can be calcined to high bulk density soda ash.

It is also known to carbonate diaphragm liquor as taught in German published application No. 1,567,921 and German published unexamined application No. 1,881,168. In this Bayer-Chemibau process, the caustic liquor is first concentrated by evaporation, and the main quantity of the NaCl is crystallized out and separated. The sodium salts which remain in the solution e.g., typically about 3.2 percent by weight of NaCl and 0.2 percent by weight of $Na_2SO_4$, build up in the mother liquor during the carbonation because the mother liquor is recycled; as a result of this build up, a chloride- and sulfate-containing soda is produced which is not of commercially acceptable quality. This technique is fully described in the copending U.S. Pat. application of Herbert Furkert, Ser. No. 164,013, filed July 19, 1971, the contents of which are incorporated by reference herein.

While this process is suitable for many applications, it has been found according to the present invention that when using sodium hydroxide starting materials contaminated with salts such as chlorides, sulfates, chlorates, bromides, and the like, such as in sodium hydroxide which is obtained in the diaphragm cell process for producing chlorine, recycling all of the mother liquor into the carbonation stage causes these salts such as chlorides to build up in the system, thereby contaminating the final product and rendering it unacceptable for commerical use without further costly purification. Mere purging of the mother liquor in this context is economically wasteful, since additional apparatus is needed to monitor the chloride content in the mother liquor and final product, and to regulate the timing and extent of the purging. Furthermore, the purged liquor is saturated with sodium carbonate monohydrate, and disposal thereof considerably reduces the yield of the process. Additionally, the chloride content of the purged liquor is too low to economically recycle it directly into brine treatment. Discarding purged mother liquor results in an economic loss of $4,000 per kiloton as compared to the present process, as well as requiring that monitoring and control equipment be added to the basic apparatus.

Copending U.S. Pat. application Ser. No. 226,024 describes a single stage process for the production of sodium carbonate monohydrate which comprises carbonating an aqueous sodium hydroxide solution containing about 45 to 55 percent by weight NaOH and from 0.2 to 5 percent by weight of an inorganic salt, e.g., a chloride, with a $CO_2$-containing gas at a temperature of from 70° to 100° C to form sodium carbonate monohydrate at a steady state concentration of sodium chloride in the liquid phase of from 1 to 5 percent by weight with simultaneous evaporation of water, preferably of about 50 to 85 percent of the total water to be evaporated. Particulate sodium carbonate monohydrate is separated from the mother liquor and the clarified mother liquor is divided into two portions, the relative volumes of which are a function of the chloride or other salt content of the sodium hydroxide starting solution. Generally, the ratio of the portion of the mother liquor in percent by volume to be passed to the evaporator stage and the chloride or other salt concentration in percent by weight will range from 5 to 50, preferably from 10 to 30. A first portion, generally comprising from about 60 to 95 percent by volume of the clarified mother liquor, is recycled to the carbonation stage. A second portion, generally comprising correspondingly from about 40 to 5 percent by volume of the clarified mother liquor, is evaporated, preferably under reduced pressure, at a temperature of from about 50° to 110° C to precipitate sodium carbonate monohydrate therefrom and remove about 15 to 50 percent by volume of the mother liquor water content therefrom. Sodium carbonate monohydrate precipitated in the evaporator is separated therefrom, leaving NaCl behind in the solution phase of the evaporation mixture. the sodium carbonate monohydrate separated in the evaporation stage is preferably recycled to the carbonation stage, whereas the sodium carbonate monohydrate separated in the carbonation stage can be calcined directly to high bulk density soda ash.

By branching off a portion of the mother liquor from the recycle loop to the carbonation stage, the NaCl content in the carbonation stage is held sufficiently low to produce a separated monohydrate which, without further treatment, has a chlorine content of less than 1 weight percent, generally less than 0.3 weight percent.

The final solution remaining in the evaporation stage after separation of the monohydrate contains almost the entire NaCl which enters into the process with the sodium hydroxide solution, and is saturated with $Na_2CO_3$ at the discharge temperature. This final liquor can be employed for the electrolysis in the preparation of the brine.

OBJECTS OF THE INVENTION

Accordingly, it is a general object of this invention to provide a process for producing commercially pure sodium carbonate monohydrate.

Another object of this invention is to provide a process for producing sodium carbonate monohydrate of commercially acceptable purity from a sodium hydroxide solution contaminated with chloride.

A further object of this invention is to provide a continuous process for producing sodium carbonate monohydrate which can be calcined into a dense soda ash in which the chloride and sulfate contents are reduced to commercially acceptable amounts.

An additional object of this invention is to provide a process for producing sodium carbonate monohydrate from a sodium hydroxide solution which has been obtained as a product in a diaphragm cell process for the electrolytic production of chlorine.

Yet another object of this invention is to provide a diaphragm cell process for the electrolytic production of chlorine wherein the sodium hydroxide solution obtained as a product is economically converted directly to commercial grade sodium carbonate monohydrate, which can be optionally calcined to produce commercial grade high bulk density soda ash.

A more particular object of this invention is to provide a continuous process for producing sodium carbonate monohydrate wherein a non-recycled portion of the mother liquor is usable directly without subjecting it to evaporation.

Other objects and advantages of this invention will become apparent to those skilled in the art upon further study of the specification and appended claims.

SUMMARY OF THE INVENTION

The above and other objects are attained in one aspect of this invention by providing in a process for the production of sodium carbonate monohydrate from a sodium hydroxide solution formed by the diaphragm process by evaporation of the sodium hydroxide solution down to an NaOH concentration of from 45 to 55 wt percent NaOH, separation of the thus-precipitated NaCl, carbonation of the evaporatively concentrated sodium hydroxide solution with a carbon dioxide containing gas at a temperature between 70° and 110° C, to form sodium carbonate monohydrate and simultaneously evaporating water, separation of the sodium carbonate monohydrate formed from the mother liquor and recycling of a part of the mother liquor to the carbonation stage, the improvement which comprises:

a. establishing and maintaining a steady state NaCl concentration of about 13–20 weight percent in the liquid phase of the carbonation mixture by continuously separating a sufficient portion of said clarified mother liquor from the recycle stream;

b. separating particulate monohydrate from the inorganic salt contaminant remaining in a solution phase of the evaporation mixture; and c. washing separated monohydrate to remove salt contaminant-containing solution adhering thereto with water optionally containing soda.

DETAILED DISCUSSION

Contaminated sodium hydroxide solution to which this invention is particularly applicable are aqueous sodium hydroxide solutions contaminated with 0.2–5 weight percent, preferably 0.5–2 weight percent of at least one inorganic salt, e.g., a chloride, chlorate, bromide, sulfate, etc., preferably a chloride. Especially suitable are aqueous solutions of sodium hydroxide which have been obtained in the production of chlorine via the diaphragm cell process; and the process will accordingly be described in detail with reference to using such starting material. One of the features of this invention lies in permitting the contaminating salt to build up in the liquid phase of the carbonation reactor to a concentration approaching but not reaching saturation; since the liquid phase may not be absolutely homogeneous. Tis concentration is preferably established and maintained at about This 20 wt. percent NaCl to prevent localized areas of saturation or supersaturation from forming precipitates of the contaminating salt. The minimum value of about 13 percent is required to obtain a economic process.

The aqueous sodium hydroxide solution is preferably brought to a concentration of 45–55 weight percent NaOH prior to the carbonation stage; this can be effected by conventional evaporation or other suitable techniques. NaCl which precipitates is separated and the resultant concentrated NaOH is fed to the carbonation stage.

In a particularly preferred embodiment, carbonation is conducted at an average temperature of between 70° and 110° C. In this temperature range, under normal pressure, a satisfactory rate of water evaporation is attained; in this connection, the carbonation temperature within this range will increase as the $CO_2$ content of the gas increases, as is known in the art. The carbonation reactor is preferably an agitator-equipped vessel, wherein the carbon dioxide is introduced in finely divided form, for example with the aid of a gas-distributing agitator. Other known carbonation reactors wherein a coherent liquid phase is present can likewise be utilized. The separator for separating the carbonation mixture into sodium carbonate monohydrate and mother liquor is preferably a centrifuge, but it is also possible to use other known devices, such as filters. Preferably, in the carbonation stage, 40 to 95 percent by weight of the total water content of the NaOH concentrate is evaporated; in this manner, heat liberated in the carbonation stage is utilized for the water evaporation.

One apparatus suitable for conducting the process of this invention comprises a carbonation stage with a recirculating system connected thereto wherein a device for separating the sodium carbonate monohydrate from the mother liquor is arranged. The separated monohydrate can be automatically sedimented and washed; in this manner, the adhering solution of monohydrate exhibits a considerably lower salt content than the solution phase of the carbonation stage.

It has now been found that the desired low Cl-content, i.e., less than 0.3 weight percent, in the resulting dense soda can also be achieved without an additional evaporation stage for the non-recycled part of the mother liquor. In the process according to this invention, a sodium hydroxide solution from the diaphragm process is evaporated down to an NaOH concentration of from 45 to 55 weight percent, the thus-precipitated NaCl is separated, the evaporatively concentrated sodium hydroxide solution is carbonated with a carbon dioxide-containing gas, preferably at a temperature of from 70° and 110° C, to form sodium carbonate monohydrate and simultaneously evaporate water, the sodium carbonate monohydrate formed is separated from the mother liquor and optionally dehydrated to dense soda, and only a part of the mother liquor is recycled to the carbonation stage.

The separated sodium carbonate monohydrate is washed with water preferably containing sodium carbonate or sodium hydroxide to reduce the dissolution of the monohydrate in the wash water. It has surprisingly been found that it is possible to obtain in this way a dense soda containing at most 0.3 wt. percent Cl, although the crystallization of the monohydrate takes place from a comparatively NaCl-rich solution. In contrast to previously proposed processes involving evaporation of a branched off portion of the mother liquor, the present process has the advantage that the second evaporation stage is dispensed with but the resulting soda nevertheless has at least about the same purity. Moreover, the resulting soda has a high abrasion resistance and a particle content which makes it particularly suitable for use in the glass industry (see, e.g., German Pat. No. 1,076,651 and German published specification DAS No. 1,567,901).

Preferably 5 to 8 weight percent of the mother liquor, calculated on the sodium hydroxide solution charged to the carbonation stage, is separated from the remainder of the mother liquor and used for other purposes, particularly for brine preparation. At least a portion of the non-recycled mother liquor can be used in the preparation of salt brine for electrolysis, i.e., for the precipitation of dissolved heavy metals, for example as disclosed in Chemical Engineering 61 (1954) No. 3, page 118.

Likewise, when hydrochloric acid is either produced from chlorine obtained in the diaphragm process and/or is obtained as a by-product from the use of chlorine to chlorinate hydrocarbons, for example, the non-recycled part of the mother liquor can be neutralized with HCl and the salt solution obtained can be electrolyzed afresh. Then, through these uses which are integrated with the electrolysis reaction, there is achieved an economic utilization of the branched-off mother liquor.

Through the continuous separation of a part of the mother liquor, a steady state NaCl-concentration is maintained in the solution of the carbonation mixture. This concentration must be at a minimum of about 13 percent by weigh NaCl but sufficiently below the saturation concentration under the reaction conditions so that crystallization of NaCl is avoided in all cases. In general the maximum concentration is about 20 percent by weight NaCl, the preferred maximum being about 18 wt. percent. The preferred minimum concentration is about 15 percent.

The separated sodium carbonate monohydrate is preferably washed with 5 to 15 wt. percent water which preferably contains 10 to 30 percent sodium carbonate. The quantity of wash fluid must suffice to remove the NaCl-containing solution adhering to the monohydrate. On the other hand it should be washed with the smallest amount of water possible because the whole wash water must be evaporated again in the carbonation stage. Instead of water, the monohydrate can also be washed with an NaCl-free sodium hydroxide solution, e.g., one which results from washing of the off-gas emitted from the dehydration stage. The washing of the monohydrate suitably occurs continuously together with the other process stages, e.g., using a continuous filter belt or in a continuous flow centrifuge, but can be operated discontinuously. The process is particularly suitable if the soda lye is carbonated with a gas containing 8 to 45 vol. percent $CO_2$. With use of this $CO_2$-laden gas, e.g., flue gas, a sufficiently large reactor volume is generally available so that the necessary heat exchange surfaces for the evaporation of the water content which has been augmented by the wash water can be provided in the carbonation reactor.

According to a preferred embodiment of this invention the wash solution resulting from the washing of the sodium carbonate monohydrate is recycled to the carbonation stage, where the $Na_2CO_3$ contained in the wash solution is converted to monohydrate and/or dense soda and the yield of the process is correspondingly improved.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

A sodium hydroxide solution obtained from the diaphragm process containing about 15 wt. percent NaCl and about 11 wt. percent NaOH is evaporated down to 50 wt. percent NaOH, whereby a major portion of the sodium chloride crystallizes out and is separated.

1,100 kg/hr of the resultant sodium hydroxide solution, which contains about 1 wt. percent NaCl as well as a smaller amount of $Na_2SO_4$, is charged to a carbonation reactor. Conversion of this sodium hydroxide solution is effected with a flue gas which contains 9.3 vol. percent $CO_2$ and 18 vol. percent $H_2O$; water is simultaneously evaporated in the reactor and removed as steam. The temperature of the carbonation mixture is about 76° C. A sodium carbonate monohydrate suspension is continuously withdrawn from the reactor, centrifuged and washed with 69.6 kg/hr of a 3 percent soda solution. The wash water is recovered and fed to the carbonation reactor where it is evaporated.

56.5 kg/hr of mother liquor is separated, thereby maintaining a steady state concentration of 17 wt. percent NaCl in the solution of the carbonation mixture. The separated portion of mother liquor is removed for use integral with the process, while remaining mother liquor is recycled into the carbonation reactor.

The moist crystallizate recovered hourly from the centrifuge contains 847.3 kg sodium carbonate monohydrate. It is dehydrated at 105°–175° C and dried. 722.8 kg/hr of soda are obtained having a NaCl-content of 0.2 percent and a bulk density of $d = 1.02$. Yield is 99 percent of theoretical. The use of separated mother liquor integral with the process is made for the precipitation of Ca, Mg ions from the brine by mixing a portion of it with the brine and separating the formed carbonate sludge by filtration.

The process according to the invention is suitable for processing all sodium hydroxide solutions which have a content of 10 to 20 wt. percent NaOH and of 10 to 20 wt. percent NaCl, especially such solutions obtained from the diaphragm process. In particular, the aqueous sodium hydroxide solution entering the carbonation reactor should contain about 45–55, preferably 48 to 52 wt. percent NaOH, and about 0.2 to 5, preferably 0.5 to 2 wt. percent NaCl. In addition to high-percent carbon dioxide, it is also possible to employ waste gases of a low impurity content, with $CO_2$ content of above about 8 percent by volume in the carbonation stage.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of sodium carbonate monohydrate from a sodium hydroxide solution formed by the diaphragm process by evaporation of the sodium hydroxide solution down to an NaOH concentration of from 45 to 55 wt % NaOH, leaving residual NaCl contaminant dissolved in the evaporatively concentrated sodium hydroxide solution, separation of the thus-precipitated NaCl, carbonation of the evaporatively concentrated sodium hydroxide solution with a carbon dioxide containing gas at a temperature between 70° and 110° C, to form sodium carbonate monohydrate and simultaneously evaporating water, separation of the sodium carbonate monohydrate formed from the mother liquor and recycling of a part of the mother liquor to the cabonation stage, the improvement which comprises:
   a. establishing and maintaining a steady state NaCl concentration of about 13–20 weight percent in the liquid phase of the carbonation mixture by continuously separating a sufficient portion of said clarified mother liquor from the recycle stream;
   b. separating particulate monohydrate from inorganic sodium salt contaminants remaining in a solution phase of the evaporation mixture; and
   c. washing separated monohydrate to remove the inorganic sodium salt contaminant-containing solution adhering thereto with water optionally containing soda.

2. A process according to claim 1, wherein said NaCl contaminant dissolved in the evaporatively concentrated sodium hydroxide solution is present in an amount of 0.2–5 percent by weight.

3. A process according to claim 1, wherein said NaCl contaminant dissolved in the evaporatively concentrated sodium hydroxide solution is present in an amount of from 0.5–2 percent by weight.

4. A process according to claim 1 wherein said steady state concentration is maintained at 13–18 weight percent NaCl.

5. A process according to claim 4, wherein said carbonation takes place at a steady state sodium chloride concentration in the liquid phase of from 15–18 percent by weight.

6. A process according to claim 1, wherein the separated monohydrate is washed with 5–15 weight percent water.

7. A process according to claim 6, wherein said water contains 10 to 30 weight percent sodium carbonate.

8. A process according to claim 7, further comprising recycling the resultant wash solution to the carbonation stage.

9. A process according to claim 1, wherein the sodium hydroxide solution is carbonated with a gas containing 8–45 vol. % $CO_2$.

10. A process according to claim 9, wherein said aqueous sodium hydroxide solution is obtained in the production of chlorine via the diaphragm cell process.

11. A process according to claim 1, further comprising calcining the sodium carbonate monohydrate into high bulk density soda ash.

12. A process according to claim 1, wherein 5 to 8 percent of the mother liquor, calculated on the sodium hydroxide solution charged to the carbonation, is separated.

13. A process according to claim 12, further comprising neutralizing the separated mother liquor with HCl and electrolyzing the resultant salt solution by the diaphragm process to produce a sodium hydroxide solution.

* * * * *

UNITED STATES PATENT OFFICE
CERTIFICATE OF CORRECTION

Patent No. 3,843,768  Dated October 22, 1974

Inventor(s) Ulrich Neumann

It is certified that error appears in the above-identified patent and that said Letters Patent are hereby corrected as shown below:

IN THE HEADING, COLUMN 1, THE FOREIGN APPLICATION PRIORITY DATA SHOULD READ:

-- July 2, 1971      Germany      2132922.6

February 12, 1971  Germany      2106786.7 --

Signed and sealed this 7th day of January 1975.

(SEAL)
Attest:

McCOY M. GIBSON JR.          C. MARSHALL DANN
Attesting Officer            Commissioner of Patents